United States Patent [19]

Nardi et al.

[11] Patent Number: 4,622,209

[45] Date of Patent: Nov. 11, 1986

[54] PROCESS AND APPARATUS FOR REDUCING THE CHANCES OF IGNITION AND EXPLOSION DUE TO THE DECOMPOSITION OF HIGH-PRESSURE INDUSTRIAL PROCESS GASES

[75] Inventors: Alain Nardi, Bolbec; Jean-Nöel Simier, Lillebonne, both of France

[73] Assignee: Societe Chimique des Charbonnages-CdF Chimie, Paris, France

[21] Appl. No.: 143,636

[22] Filed: Apr. 25, 1980

[30] Foreign Application Priority Data

Apr. 25, 1979 [FR] France ............................ 79 100444

[51] Int. Cl.⁴ .............................................. A62C 3/00
[52] U.S. Cl. ........................................ 422/112; 169/9;
169/20; 169/28; 169/45; 169/60; 169/61;
169/68; 169/70; 220/88 R; 422/2; 422/117
[58] Field of Search ............................ 220/88 R, 88 B;
422/113, 112, 117, 2; 169/56, 60, 26, 28, 61, 9,
20, 85, 89, 45, 66, 68, 70

[56] References Cited

U.S. PATENT DOCUMENTS

| 2,317,836 | 4/1943 | Weaver | 422/117 |
| 3,781,256 | 12/1973 | Sadee et al. | 526/71 |
| 3,871,458 | 3/1975 | Dumazet | 169/45 |
| 4,069,873 | 1/1978 | McClure | 169/9 |
| 4,115,638 | 9/1978 | Becker et al. | 528/499 X |
| 4,281,717 | 8/1981 | Williams | 169/66 X |
| 4,319,640 | 3/1982 | Brobeil | 169/28 |

Primary Examiner—Barry S. Richman
Assistant Examiner—William R. Johnson
Attorney, Agent, or Firm—Finnegan, Henderson, Farabow, Garrett & Dunner

[57] ABSTRACT

The danger of explosion due to decomposition of high-pressure industrial process gases, such as ethylene, is reduced by beginning to cool the decomposition gases with a delay of no more than 25 milliseconds from the onset of flow of the gases out of a high-pressure vessel.

The process may be implemented by using apparatus comprising:

(1) means containing an inert gas at a pressure P between about 5 and 50 bars and an inert liquid of high heat of vaporization; and (2) a valve located upstream of an inert-liquid dispersing-means, of which the opening is operated by a means detecting the opening of a safety means of the high-pressure vessel and operating the working of the dispersing means.

The apparatus is useful for the recovery of decomposition gases in order to avoid atmospheric pollution, as well as for reducing the risk of explosion.

6 Claims, 2 Drawing Figures

PROCESS AND APPARATUS FOR REDUCING THE CHANCES OF IGNITION AND EXPLOSION DUE TO THE DECOMPOSITION OF HIGH-PRESSURE INDUSTRIAL PROCESS GASES

BACKGROUND OF THE INVENTION

The present invention relates to a process and apparatus for reducing the danger of ignition and explosion from the decomposition of industrial process gases under high pressure, such as ethylene in a high-pressure polymerization plant.

It is well known that there is a danger of explosion in the presence of unstable industrial process gases maintained under pressure that are subject to decomposition. For example, it is well known that in the course of polymerizing ethylene at high pressure (approximately 300 to 3,000 bars) and at high temperature (approximately 150° C. to 350° C.), some operational difficulties such as mechanical failures or insufficient purity in the gaseous ethylene, despite careful monitoring of the pressure and temperature indicators, may result in heating a fraction, even if small, of the ethylene contained in the polymerization reactor or in the separator (operating ordinarily at a pressure between 100 and 500 bars) to a temperature exceeding about 450° C. Such heating is enough to initiate the decomposition of that fraction of ethylene into a mixture of carbon, hydrogen, and methane. Furthermore, the above-cited operating conditions for the reactor and the separator are such as to allow a rapid propagation of any initiated decomposition, invariably resulting in rapid increases in pressure and/or temperature. The reactor and separator are protected against excessive pressure by the rupture of at least one member (disk, valve, relief vent) with a safety function, whereby the decomposition products can escape into the atmosphere. Besides the polluting effect of the expulsion into the atmosphere of the pulverulent carbon, the ignition of the decomposition gases must especially be feared, because it causes violent explosions capable of material damage and human injury.

Several solutions to this problem of deleterious ignition and its consequences, seeking to meet safety requirements in case of decompression of high-pressure polymerization plants, already have been proposed, in particular by U.S. Pat. Nos. 3,781,256, 3,871,458, and 4,115,638, and by the Japanese patent applications 48-51.336/73 and 48-51.337/73 filed on May 9, 1973. All these solutions have in common that they remedy at least one of the three presumed conditions for the ignition of decomposition gases: high pressure, high temperature, and supersonic velocity of the gases. Therefore these solutions generally consist in cooling by various means the decomposition gases of which the initial temperature—as noted above—exceeds 450° C., and may in fact reach 1,500° C. Besides, in order to prevent polluting the ambient atmosphere by the decomposition gases, the recommendation is made to lower the pressure and/or the velocity of the gases below the speed of sound. In short, all these solutions are based on the hypothesis stated in the U.S. Pat. No. 3,781,256, namely that the problem of the ignition of the decomposition gases is reduced to the problem of auto-ignition of these gases due to their own high temperature.

Now the applicants have unexpectedly discovered that contrary to the teachings of the prior art, the auto-ignition of the decomposition gases due to their own high temperature is not necessarily the main cause of ignition in these gases and most of the time is only a secondary cause. This discovery results from experiments carried out on ethylene in the absence of decomposition in a reactor using rupture tests of at least one safety means, the ethylene temperature at the time immediately preceding the rupture not exceeding 200° C. These experiments have shown that despite the absence of anomalous heating prior to rupture of the safety means, an emission of flaming gas at the discharge of the evacuation pipe (chimney) and the presence of a shock wave, which propagates at a rate of approximately 500 to 700 m/s, are noted.

The observed phenomenon might be explained as follows. After the safety means has been ruptured, the air contained in the evacuation pipe (chimney) and initially at rest is passed by a pressure wave moving at a velocity that depends on its intensity and exceeds that of sound in the medium. This pressure wave therefore precedes the flow of the ethylene or of the decomposition gases in the evacuation pipe, and compresses and heats the air contained in the pipe. Further, since in general the evacuation pipe is not wholly linear but comprises at least either a curved section joining the side wall of the reactor or separator to the vertical section of the chimney or a variation in cross-section, the pressure wave as a rule will not be planar and therefore can be reflected from the walls of the evacuation pipe. These wave reflections permit wave focusing on the axis of symmetry of the pipe and therefore the heating of particular point locations in the evacuation pipe. Lastly, the possibility of successive reflections of the safety disk onto the walls of the chimney represents a third source of local heating together with that from the pressure wave and combines its effects with the others.

The heating phenomena described above suffice, even in the absence of any ethylene decomposition, to raise the temperature at particular points in the chimney to above 600° C. The diffusion phenomena, the differences in gas flow speeds in the chimney between its walls and its axis of symmetry, the variations in cross-section, and the changes in the direction of the stack contribute locally to form pre-mixing zones of air and gas. Ignition is initiated at the hot-air/ethylene interface, which moves at a speed less than that of the pressure wave and therefore lags this wave, and more precisely at the level of these pre-mixing zones. The premixing zones thereafter are carried by the evacuation to the outside of the chimney; therefore they disappear rapidly from the chimney when the air is replaced by the gas. Similarly the flame is carried by the flow toward the exhaust section of the chimney, where it remains during the entire period of evacuation. Gas ignition by the pressure-wave effect as just described is enhanced by a high temperature of the gas, whereby the temperature of the air-gas mixture is increased, and consequently a decomposition gas is more likely to ignite by the pressure-wave effect than ethylene at 200° C. This increase in the temperature of the air-gas mixture thus demonstrates that auto-ignition of decomposition gases caused by their own temperature—previously considered to be the root cause of ignition—instead is a derived and secondary effect from the pressure wave.

All the previous art solutions for the ignition problem that are described in the above-cited patents sought to cool the decomposition gases either when being evacuated into the atmosphere or when being recovered.

These solutions therefore failed to adequately take into account the time-parameter of the mechanism from the opening of the safety means to the end of the evacuation. This parameter, however, was found to be of crucial importance as shown by the work of applicants. The cited patents state that the duration of evacuation as a rule is between 3 and 10 seconds, and U.S. Pat. No. 3,781,256 states that the time between opening the safety means and the arrival of the gas at the cooling system is about 50 to 100 milliseconds. Under these conditions, it is not surprising that the effectiveness of the prior art solutions should have been inadequate, because, in view of applicants' observations, the duration of the non-steady-state flow phase resulting in the pressure wave effect generally is equal to or less than 25 milliseconds. Considering the discovery of the nature and the duration of the main cause of the ignition of the decomposition of gases under high pressure, such as ethylene in high-pressure polymerization equipment, the effectiveness of a process and apparatus in reducing the risk depends less on the magnitude of the implementing means than on the time of implementation. In particular, it should be noted that the recovery process of the decomposition products described in U.S. Pat. No. 4,115,638 is of a highly uncertain effectiveness when the chances of ignition are not eliminated at the discharge of the reactor or separator.

Furthermore, the prior art solutions did not take into account that the flow rate of the decomposition gases from the pressurized vessel varies with time during the evacuation, during and after its non-steady-state phase. As shown in applicants's research, this phenomenon exerts a crucial influence on the selection of the optimal method for cooling the decomposition gases, as shown further below.

SUMMARY OF THE INVENTION

A first object of the invention is to reduce the danger of ignition and explosion due to the decomposition of high-pressure industrial process gases, in particular the danger arising during the non-steady-state flow phase of the decomposition gases. A second object of the invention is to determine an optimal method for cooling the gases. A third object of the invention is to reduce the danger of ignition and explosion during the flow of the gases to such a point that their recovery, in particular for the purpose of averting any pollution, may be carried out in a perfectly safe manner.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the process of the invention for reducing the danger of ignition and explosion due to the decomposition of industrial process gases in a high-pressure vessel comprises cooling the decomposition gases with a delay of no more than 25 milliseconds starting from the time the gases begin to flow out of the pressurized vessel. This delay must be equal to or less than the average time for the gases to pass between the safety means of the pressurized vessel and the place where the gases are cooled.

Further to achieve the foregoing objects and in accordance with the purpose of the invention, as embodied and broadly described herein, the apparatus of the invention for reducing the risk of explosion upon evacuation of decomposition gases contained in a high-pressure vessel to an evacuation circuit comprises:

(1) means containing an inert gas at pressure P between about 5 and 50 bars and an inert liquid of high heat of vaporization, (2) a connecting pipe of length $L_o$ and cross-section $S_o$ located between the means containing the inert gas and liquid and the circuit into which the decomposed gases issuing from the pressurized vessel are evacuated;

(3) dispersing means for the inert liquid located at the end of the connecting pipe near the circuit;

(4) a valve of cross-section $S_1$ and length $L_1$ located upstream of the inert-liquid dispersing-means; and (5) means for detecting the opening of a protective safety means of the pressurized vessel and operating the opening of the valve and the working of the dispersing means.

The accompanying drawing, which is incorporated in and constitutes a part of this specification, illustrates one embodiment of the invention and, together with the description, serves to explain the principles of the invention.

DESCRIPTION OF THE PREFERRED EMBODIMENTS

Figure 1:
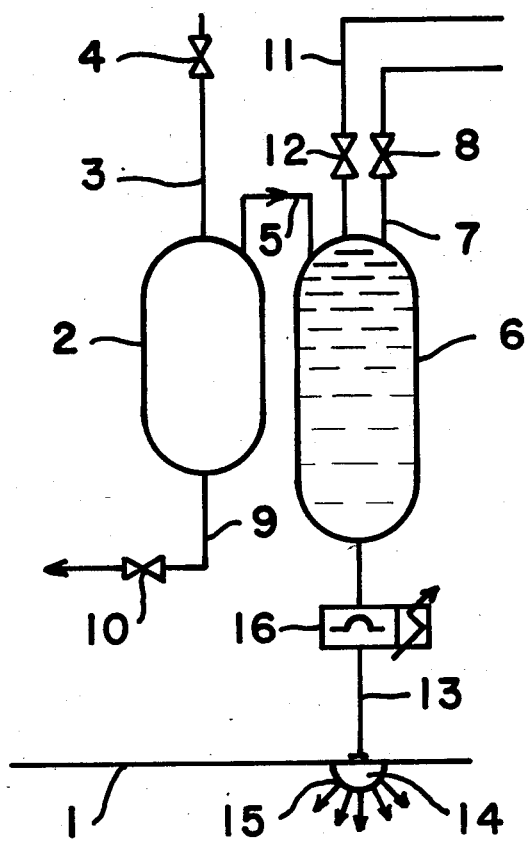
FIG. 1 is a schematic diagram of a system constructed in accordance with the present invention.

Reference will now be made in detail to the presently preferred embodiments of the invention, an example of which is illustrated in the accompanying drawings.

In accordance with the invention, the industrial process gas may be any gas held in a vessel under high pressure that is subject to decomposition and the danger of ignition and explosion. The invention is especially useful in reducing the risk of explosion from the decomposition of ethylene in high-pressure polymerization equipment. The invention will therefore be described in detail with respect to the decomposition of ethylene. It will be understood by those of ordinary skill in the art, however, that the process and apparatus described herein may easily be applied to reducing the risk of explosion from decomposition of other high-pressure industrial process gases.

Cooling of the decomposition gases generally is carried out by injecting an inert liquid of high heat of vaporization into the evacuation circuit of the gases. In such case, in a preferred embodiment of the invention, the process of the invention further comprises injecting the inert liquid at a time-varying mass flow rate that is maintained during the entire evacuation—during and after its non-steady-state flow phase—greater than the mass flow rate of the decomposition gases from the pressurized vessel. In a still further preferred embodiment, the inert liquid of high heat of vaporization is contained in a tank that is under an inert gas pressure between 5 and 50 bars, and the mass flow rate Q of inert liquid injected into the evacuation circuit of the decomposition gases varies as a function of time t according to the following equation:

$$Q = Q_{e,o}\left(1 + \frac{\gamma_g + 2}{2} \cdot \frac{Q_{e,o}}{lV_o} t\right)^{\frac{-\gamma_g}{\gamma_g+2}}$$

wherein $Q_{e,o}$ is the initial mass flow rate of the decomposition gases from the pressurized vessel;

$\gamma_g$ is the heat-capacity ratio of the inert gas above the inert liquid;

$V_o$ is the initial volume of the gaseous phase above the inert liquid; and l is the density of the inert liquid.

Preferably the initial volume of the gaseous phase above the inert liquid is not selected at random, but is a function of the initial mass flow rate of the decomposition gases from the pressurized vessel, the ratio $Q_{e,o}/V_o$ being between 0.3 and (metric tons per second per cubic meter). This ratio should be higher when the vessel is a polymerization reactor (operating at about 300 to 3,000 bars) than when it is a separator (operating at about 100 to 500 bars).

In accordance with the present invention, an inert liquid is a chemical substance that does not react with the industrial process gas and the decomposition gases and is in the liquid state under the typical pressure conditions, that is when the pressure does not exceed about 50 bars. In the case of ethylene, the inert liquid of high heat of vaporization preferably is water, but also may be a halogenated hydrocarbon. An inert gas constituting the phase above the inert liquid in its tank in accordance with invention is a gas or a mixture of gases substantially free of gases that may react either with the decomposition gases (e.g. methane and hydrogen) or with the inert liquid, and in particular should be free of oxygen. Such a gas for instance may be selected from nitrogen, carbon dioxide, ethylene, or a rare gas (helium, argon, neon, krypton, xenon).

With respect to the apparatus of the invention, the means containing an inert gas and an inert liquid in accordance with the invention may, as embodied herein, be a first tank filled with the inert gas and a second tank connected to the first by a short connecting means that has a large cross-section, the second tank being completely filled with the inert liquid. On the other hand, since each of the two tanks is completely filled with the fluid (gas or liquid) assigned to it, the two tanks may be replaced by a single tank in which the inert liquid is below a gas phase maintained at a pressure between 5 and 50 bars. Whether the two tanks are separate or combined into a single tank, the volume of the inert liquid is preferably 50 to 80% of the total volume of the liquid and gaseous phases.

The valve located upstream of the inert-liquid dispersing means may be a hydraulic one, or, preferably, an explosive one. The latter type of valve is preferred because of its very short response time, which is of the order of 5 milliseconds. It may be located either in the connecting means between the two tanks, or, preferably, between the second tank and the dispersing means.

The apparatus of the invention described above allows injecting the inert liquid using the dispersing means at a time-varying mass flow rate defined by the equation above. The initial mass flow rate of the decomposition gases from the pressurized vessel being known, the inert liquid and the inert gas and the volume $V_o$ of the first tank or of the first phase in the single tank having been selected, this equation will then be completely defined. Furthermore, in order that the cooling of the gases begins not more than 25 milliseconds after the onset of the flow of the decomposition gases out of the pressurized vessel, it is necessary that the inert liquid be set in motion within 20 milliseconds (considering that the response time of the valve is of the order of 5 milliseconds). To achieve such a result, it was found that the geometries of the connecting pipe and of the equipment valve must be interrelated with the initial mass flow rate $Q_o$ of inert liquid discharged by the apparatus in such a manner that $Q_o(L_o/S_o+L_1/S_1)$ will not exceed 22 (metric tons per meter per second). Considering the flow rate of the decomposition gases and the typical location selected for the dispersing means in the evacuation circuit of the gases, it is generally sufficient that the time to set the liquid in motion be between 5 and 20 milliseconds, and, consequently, that $Q_o (L_o/S_o+L_1/S_1)$ be between 5.5 and 22 t/m/s. As is clear from the above-defined equation, which is a function of time, the initial mass flow rate $Q_o$ of inert liquid discharged by the apparatus of the invention is equal to the initial mass flow rate $Q_{e,o}$ of the decomposition gases from the pressurized vessel.

In accordance with the invention, the liquid dispersing means located at the end of the connecting pipe and near the evacuation circuit for the decomposition gases may be of various designs. It may be for instance an apparatus such as is described in U.S. Pat. No. 3,871,458, or else a sprinkler head type comprising a set of orifices of total cross-section S. In the latter case the cross-section S preferably is selected as a function of the initial mass flow rate $Q_o$, of the pressure P of the inert gas phase a of the density $\rho$ of the inert liquid so that $S\sqrt{\rho P}/Q_o$ is between 1 and 1.4, when S, P, and $Q_o$ are expressed in the International System.

The invention will be better understood by referring to the schematic illustrations in the drawings. In FIG. 1, 1 denotes the wall of the evacuation circuit for the decomposition gases that are to be cooled. The first tank 2 is kept under nitrogen pressure by a nitrogen supply circuit 3 provided with a valve 4. This tank is connected by a short connecting pipe 5 of large cross-section to the second tank 6, which is kept filled with water by a water supply circuit 7 provided with a valve 8. In case the water should rise through the connecting pipe 5 toward the tank 2, the latter is provided with a drainage circuit 9 comprising a valve 10. Similarly the top of tank 6 comprises an air evacuation circuit 11 with a valve 12. A connecting pipe 13 as short as practical is located between the bottom of tank 6 and wall 1. The end of this pipe is provided with a dispersing means 14 comprising, as embodied herein, a set of orifices 15. An explosive valve 16, the opening of which is operated by a means for detecting the decomposition of the industrial process gas (e.g. ethylene) is located between the bottom of tank 6 and the dispersing means 14. This detecting means, as embodied herein, consists of a rupture sensor in the form of a safety disk for the pressurized vessel from which the decomposition gases are evacuated. The detecting means and the circuit connecting it to the valve 16 are not shown.

Figure 2:
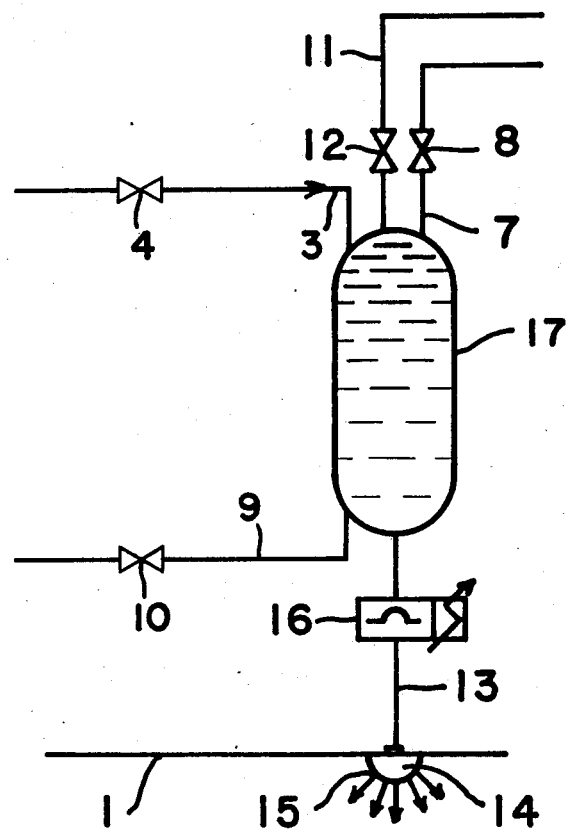
FIG. 2 is a schematic diagram of a second system in accordance with the present invention.

FIG. 2 is another preferred embodiment of the present invention using a single tank 17 in place of tanks 2 and 6 shown in FIG. 1.

The process of the invention can be advantageously combined for the purpose of further reducing the risk of ignition and explosion with a process comprising maintaining the major part of the decomposition-gas evacuation-circuit under an inert gas atmosphere, in particular that part of this circuit where the apparatus of the present invention is located. Inert gases suitable for such an atmosphere are the same as those previously defined. The inert gas constituting the atmosphere furthermore can be the same as that contained in the first tank of the apparatus of the present invention. The reduction of the risk of ignition and explosion achieved by the process of the invention is so substantial that the process can be combined with a recovery process for the decomposition gases, whereby the gases are recovered at pressures less than 50 bars, at temperatures less than 450° C., and at oxygen concentrations less than 5%. It is significant that the progress and the success of the process of the invention are such that the temperature in the recovery phase of the gases can exceed that of the prior art.

Finally the process of the invention can be advantageously combined for the purpose of still further reducing the risk of ignition and explosion with a process for evacuating the decomposition gases into an evacuation means comprising:

(1) a reservoir with a volume 2 to 100 times that of the pressurized vessel from which the gases are evacuated;

(2) at least one connecting pipe between the vessel and the reservoir; and (3) at least one, preferably only one, chimney connecting the reservoir to the atmosphere.

In this latter case, the apparatus of the invention preferably is so arranged that the inert liquid will be injected by the dispersing means into the reservoir.

It will be apparent to those skilled in the art that various modifications and variations could be made in the process and apparatus of the invention without departing from the scope or spirit of the invention. In particular, although the invention has been described for the purpose of illustration with respect to ethylene, it is equally applicable to other industrial process gases, as will be readily understood by those having ordinary skill in the art.

What is claimed is:

1. An apparatus for reducing the risk of exposion upon evacuation of decomposition gases contained in a high-pressure vessel to an evacuation circuit comprising:

(a) means for containing an inert gas at a pressure, P, between about 5 and 50 bars and an inert liquid of high heat of vaporization;

(b) an airtight evacuation circuit into which said decomposition gases issuing from said high-pressure vessel are evacuated;

(c) a connecting pipe of length $L_o$ and cross-section $S_o$ in flow communication with said means for containing said inert gas and liquid and said evacuation circuit;

(d) inert liquid dispersing means for dispersing said inert liquid in said evacuation circuit within 20 milliseconds of activation, located at an end of said connecting pipe, and for delivering said inert liquid to said evacuation circuit at an initial flow rate, $Q_o$;

(e) valve means for opening within 5 milliseconds after activation of cross-section $S_1$ and length $L_1$, located within said connecting pipe; and (f) means for operating said valve means responsive to the pressure in said evacuation circuit.

2. The apparatus of claim 1, wherein said means for containing said inert gas and said inert liquid comprises:

(a) a first tank filled with said inert gas; and (b) a second tank connected to said first tank by a short communication means that has large cross-section, said second tank being filled with said inert liquid, wherein said valve is located between said second tank and said dispersing means.

3. The apparatus of claim 1, wherein said means for containing said inert gas and said inert liquid comprises a single tank.

4. The apparatus of claim 2 or 3, wherein said valve is an explosive valve.

5. The apparatus of claim 1, wherein the initial mass flow rate of the inert liquid and the connecting pipe and the valve are interrelated in such a manner that $Q_o(L_o/S_o + L_1/S_1)$ does not exceed 22 t/m/s.

6. The apparatus of claim 1 or 5, wherein the inert liquid dispersing means comprises a set of orifices of total cross-section, S, and $S\sqrt{\rho P}/Q_o$ is between 1 and 1.4, wherein $\rho$ is the density of the inert liquid;

P is the pressure of the inert gas phase; and $Q_o$ is the initial mass flow rate.

* * * * *

UNITED STATES PATENT AND TRADEMARK OFFICE
CERTIFICATE OF CORRECTION

PATENT NO. : 4,622,209

DATED : November 11, 1986

INVENTOR(S) : ALAIN NARDI ET AL

It is certified that error appears in the above-identified patent and that said Letters Patent is hereby corrected as shown below:

```
Claim 1, column 7, line 46, change
"exposion" to --explosion--.
```

Signed and Sealed this

Seventeenth Day of February, 1987

*Attest:*

DONALD J. QUIGG

*Attesting Officer*     *Commissioner of Patents and Trademarks*